(No Model.)
W. READ, Jr.
TRANSPARENCY.
No. 346,864. Patented Aug. 3, 1886.
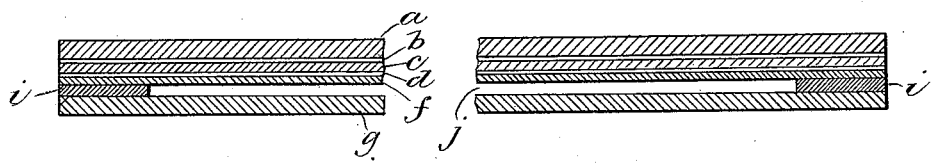
Witnesses.
M. L. Williams,
W. H. Bartlett
Inventor.
Wm Read Jr.
by Wight & Brown
Attys

United States Patent Office.

WILLIAM READ, JR., OF BOSTON, MASS., ASSIGNOR, BY MESNE ASSIGNMENTS, TO THE BOSTON TRANS-PHOTOTYPE COMPANY, OF SAME PLACE.

TRANSPARENCY.

SPECIFICATION forming part of Letters Patent No. 346,864, dated August 3, 1886.

Application filed May 6, 1885. Serial No. 164,595. (No model.)

*To all whom it may concern:*

Be it known that I, WILLIAM READ, Jr., of Boston, in the county of Suffolk and State of Massachusetts, have invented certain new and useful Improvements in Transparencies, of which the following is a specification.

This invention has for its object to render photographic prints or other pictures on paper sufficiently transparent or translucent to make them desirable as so-called "transparencies;" and to this end it consists in a transparency composed of a front plate of glass, a coating of transparent glutinous substance on the back of the glass, a sheet of paper on which is a photographic print or other picture secured to the glass by said coating, a coating of a transparent preparation—such as varnish—applied to the back of the paper, a second sheet of paper applied to the last coating, and a plate of glass placed behind the whole and separated from the last sheet of paper by marginal straps of paper or other material interposed between the rear sheet of paper and the glass, an air-space being thus formed between the glass back and the rear sheet of paper, whereby the latter is prevented from touching the glass, all of which I will now proceed to describe and claim.

The accompanying drawing, forming a part of this specification, represents a sectional view, on an enlarged scale, of my improved transparency.

In carrying out my invention, I take a sheet of glass, $a$, and place on the back of it a coating, $b$, of a transparent glutinous material or glue, and while said coating is soft or "tacky" I press firmly against it a sheet of paper, $c$, on which is a photographic print or other picture, said sheet adhering firmly to the coating $b$. To the back of the sheet $c$, I apply a coating, $d$, of a transparent preparation or varnish, and against the back of this last coating I press a second sheet or backing, $f$, of plain paper. The material of the transparent coating $d$ penetrates the two paper sheets, making them both so nearly transparent that they will have much the same effect as if the picture were printed directly on thin porcelain or ground glass.

$g$ represents a backing of glass placed behind the paper backing, but separated from the latter by strips, $i$ $i$, of pasteboard or other material, interposed between the margin of the paper backing and the margin of the glass back. A space, $j$, is thus formed between the paper backing and the glass back, and the paper is prevented from coming in contact with the glass, so that the transparent preparation or varnish with which the paper is saturated cannot affect the glass back. The glass back, by excluding air from the paper backing, prevents the transparent preparation from drying to such an extent as to render the paper more opaque than is desirable. A thin film is formed on the rear surface of the paper backing by the drying of the transparent preparation thereon, said film being impervious to air, and preventing the transparent material from hardening within and between the paper sheets. The transparency thus produced is inexpensive, and has all the desirable qualities of the more costly transparencies heretofore made.

I claim—

The improved transparency composed of the glass front, the glutinous coating, the paper sheet $c$, having a print or picture, the transparent preparation at the back of the paper sheet $c$, the paper backing which, with the sheet $c$, is permeated and made transparent by said preparation, and the glass back separated from the paper backing by a space, as set forth.

In testimony whereof I have signed my name to this specification, in the presence of two subscribing witnesses, this 2d day of May, 1885.

WILLIAM READ, JR.

Witnesses:
C. F. BROWN,
HORACE BROWN.